Oct. 9, 1928.

L. M. PERKINS 1,686,637

ALTERNATING CURRENT MOTOR

Filed April 24, 1925    2 Sheets-Sheet 1

High resistance squirrel-cage.
Magnetic material.
Low resistance squirrel-cage.
Commutator winding.

WITNESSES:
G. S. Neilson
S. M. Pineles

INVENTOR
Laurence M. Perkins
BY
Wesley G. Carr
ATTORNEY

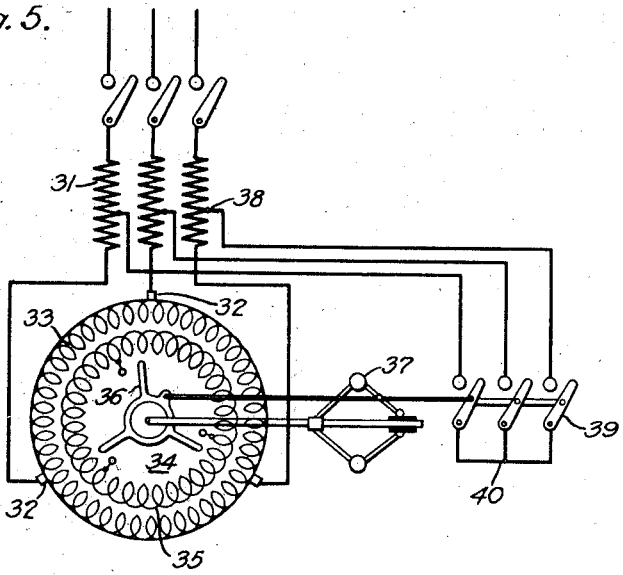
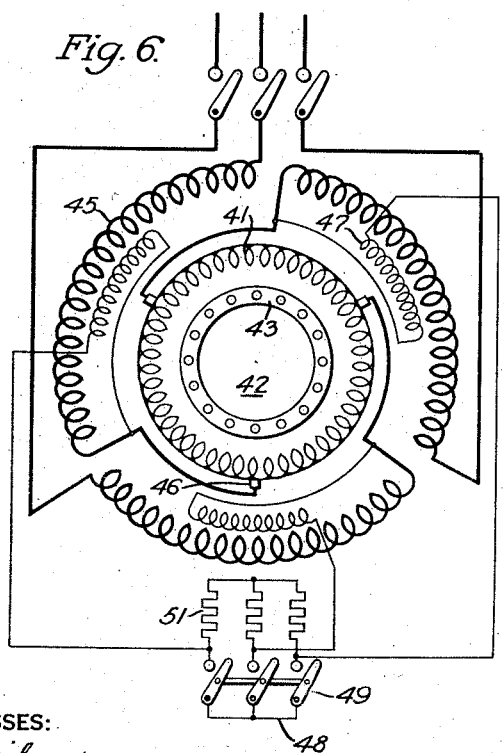
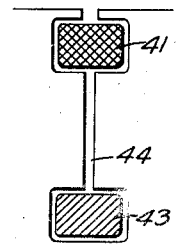

Patented Oct. 9, 1928.

1,686,637

UNITED STATES PATENT OFFICE.

LAURENCE M. PERKINS, OF WILKINSBURG, PENNSYLVANIA, ASSIGNOR TO WESTING-HOUSE ELECTRIC & MANUFACTURING COMPANY, A CORPORATION OF PENNSYLVANIA.

ALTERNATING-CURRENT MOTOR.

Application filed April 24, 1925. Serial No. 25,585.

My invention relates to alternating-current dynamo-electric machines and it has particular relation to alternating-current motors of the asynchronous type provided with a commutator for power-factor control.

The principal object of my invention is to provide an improved motor of the polyphase type which will give any desired degree of power-factor compensation and, at the same time, will have good running and starting characteristics.

In addition to power-factor compensation, motors for general industrial applications, especially those of larger sizes above two H. P., should, if possible, develop a high starting torque with low starting current, and operate at approximately constant speed over a wide range of loads. It is also desirable to provide a simple control and to avoid the use of starting resistors, complicated switches, etc. The motor should also be simple and rugged in construction.

Motors have been designed combining some of the foregoing characteristics, but I am not aware of any prior construction wherein a single motor combined all of the features enumerated. To be more specific, my invention is an improvement on the old Heyland motor described in Elektrotechnische Zeitschrift, August 8, 1901, and further described in connection with Figs. 3 and 5 of a paper by Comfort A. Adams in A. I. E. E. Transactions, January–June, 1903, Vol. XXI, pp. 519, ff.

The Heyland motor operated with a high, or even leading, power factor, by utilizing a rotating secondary member having the usual secondary winding and a commutator winding disposed close together in the same rotor slots, the commutator winding being supplied with line-frequency currents of such voltage and phase relation as to control the total wattless current taken from the line. The Heyland motor was not a success, being subject to destructively violent sparking, which Mr. Adams attributed partially to insufficient coupling between the squirrel-cage winding and the commutator winding. The Heyland motor was also subject to erratic and uncontrollable hunting or pumping, which Mr. Adams was unable to fully explain. Moreover, the Heyland machine in question was subject to the poor starting characteristics inherent in all low-resistance squirrel-cage motors.

Contrary to the above-noted teachings of the prior art, I have purposely decreased the coupling between the squirrel-cage winding and the commutator winding, utilizing, for this purpose, either an open-circuiting squirrel-cage switch or a magnetic leakage path or bridge between the secondary winding and the commutator winding.

In one embodiment of my invention, I place the commutator winding in partially buried slots, whereby it is shielded from the main flux during the period of worst commutating conditions, which occurs at very high slips, or during starting. I can then utilize a high-resistance squirrel-cage winding, to be effective in producing good starting conditions, relying upon the low-resistance commutator winding to produce good running conditions. I thus produce good starting qualities, coupled with power-factor correction, without requiring any switching apparatus.

The commutating difficulties involved in the increased reactance of the commutator winding may be overcome partially by known methods of commutation, but I prefer to add an additional squirrel-cage winding having a low resistance and disposed in close relation to the commutator winding, to perform the double function of improving the efficiency and immensely improving the commutation by reducing the effective reactance of the commutator winding and relieving the same of the duty of circulating the load currents during full-speed operation.

My improved motor, therefore, provides a high starting torque and a low starting current without extra starting resistors; it operates with approximately constant speed over the full load range; and it permits any degree of power-factor compensation that may be required.

In another form of my invention, the stator winding is connected in series with a commutator winding upon the rotor, and the machine is started as a series motor having a large torque. The rotor has additional means for providing an induced closed-circuited winding and the stator has connections for establishing a neutral point, whereby at least a portion of the stator windings is caused to co-operate with the short-circuited winding on the rotor as an induction motor, a portion of the stator windings being connected in parallel to the brushes of the commutator winding to provide a shunt exciting circuit whereby the power-factor of the motor may be controlled. With this organization, I secure a high starting torque and a high power factor without employing external rheostats or other auxiliary apparatus.

The foregoing and other objects of my invention will best be understood from the accompanying drawing, wherein Figure 1 is a diagrammatic view of a motor made according to my invention;

Figs. 5 and 6 are views similar to Fig. 1, illustrating further modifications of my invention; and Fig. 7 is a view similar to Fig. 2, illustrating the arrangement of the conductors shown in Fig. 6.

Figure 1:
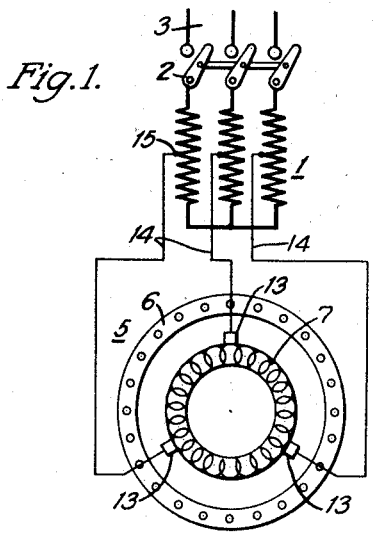

Referring to Fig. 1, an alternating-current motor constructed in accordance with my invention comprises a stator member having a polyphase winding 1 which may be energized, through a switch 2, from a polyphase line 3. The stator winding 1 co-operates with a rotor member 5, which is provided with a high-resistance squirrel-cage winding 6, which is disposed at the outer periphery of the rotor, and a commutator winding 7, which is disposed in radially deeper slots or perforations than the squirrel-cage winding.

Figure 2:
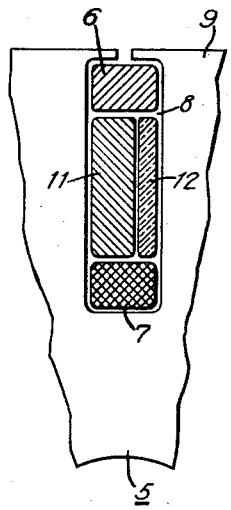
Fig. 2 is a sectional view showing a portion of the rotor and illustrating the arrangement of the conductors employed in the motor shown in Fig. 1.

The arrangement of the conductors of the two windings may be seen from Fig. 2. The squirrel-cage and commutator windings 6 and 7 are disposed, respectively, in the tops and bottoms of rectangular-shaped slots 8 of the laminations 9, the squirrel-cage winding 6 being on top. A magnetizable bar 11 is disposed in each slot, dividing the same into two slots or conductor-receiving openings, and providing a magnetic bridge between the upper and lower windings. The magnetizable bars may be disposed in side-by-side relation to bars 12 of non-magnetic material, to provide a gap of high reluctance between the opposite walls of the slots.

Three brushes 13 are uniformly spaced upon the commutator of the commutator winding 7, and apply to the same a fraction of the primary voltage by connections 14 leading to taps 15 upon the primary winding 1.

In operation, the motor is started by closing the switch 2 and energizing the primary winding 1. The commutator winding 7, on account of its position at the bottoms of the slots, has a relatively high reactance and takes little current at starting. The flux which is induced by the primary winding and penetrates the periphery of the rotor during the initial starting operation travels at substantially synchronous speed with respect to the rotor and is diverted into the magnetic bridge members 11 by the current flowing in the low-resistance commutator winding disposed at the bottoms of the slots, only so much of the flux penetrating the lower winding as is necessary to induce the small damping current flowing therein. The bridge between the two windings is of sufficient height to permit the major portion of the flux to pass therethrough. This flux induces currents in the high-resistance squirrel-cage winding 6, thus producing a powerful starting torque.

As the speed of the motor increases, the rotational speed of the flux with respect to the rotor decreases, and a larger portion of the flux threads through the commutator winding 7 disposed at the bottoms of the slots, until, at speeds near synchronism, almost the entire flux threads the lower winding. Since the commutator winding 7 is of low resistance, the same will now circulate sufficient current to obtain the torque characteristics of a good shunt motor; i. e., the motor will operate at approximately constant speed over a wide range of loads.

The electromotive force driving the current through the commutator winding is the resultant of the electromotive force induced in the winding by the relative rotation of the main field and the rotor, and the voltage impressed upon the commutator. By the shifting of the brushes and of the taps on the primary winding, the phase and the magnitude of the voltage component impressed upon the commutator may be changed, and the speed of the motor and the power factor of the currents flowing from the line may be adjusted.

In the preferred operation of my invention, the voltage-component impressed upon the rotor is adjusted principally with a view to adjusting the power-factor of the currents flowing from the line, the motor being operated at small slips like an ordinary low-resistance induction motor.

For pure power-factor compensation at no load, a small voltage impressed upon the commutator at an angle displacement of approximately 90° against the primary inducing winding will be sufficient. To obtain good power factor over the full load range, the voltage applied to the commutator is chosen somewhat larger than that necessary for full power-factor compensation at no load, and the angle of displacement of the brushes is made less than 90°.

Figure 3:
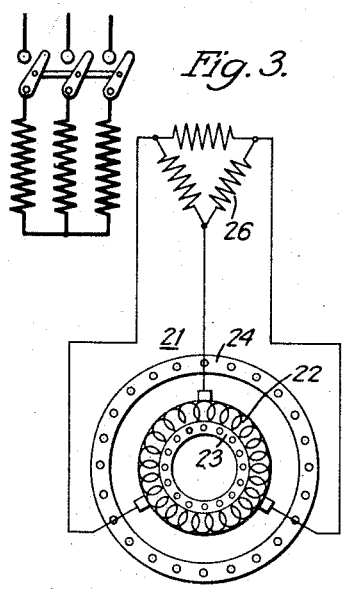
Fig. 3 is a view similar to Fig. 1, illustrating a modification of my invention.
Figure 4:
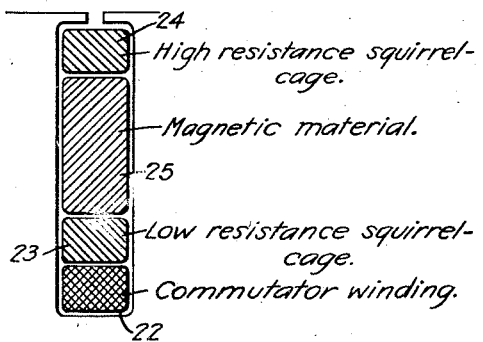
Fig. 4 is a view similar to Fig. 2, illustrating the arrangement of the conductors in the motor shown in Fig. 3.

In Figs. 3 and 4 is shown another embodiment of my motor, wherein the rotor 21 carries a commutator winding 22, which is placed in substantially side-by-side relation to a low resistance squirrel-cage winding 23 at the bottoms of the rotor slots, a high-resistance squirrel-cage winding 24 being disposed at the tops of the slots, at the periphery, and separated from the lower windings 22 and 23 by magnetizable slot filler members 25. The commutator brushes are connected to an auxiliary stator winding 26 of a small number of turns, which supplies the desired voltage component to the commutator. In this motor, the commutator winding 22 carries principally the exciting current, while the low-resistance winding carries most of the load current.

The low-resistance squirrel-cage winding, being disposed adjacent to the commutator winding, greatly improves the commutation, as it reduces the electromotive force of induction in the coils undergoing commutation. Since the low-resistance squirrel-cage winding carries a large part of the load current, the duty upon the brushes and the commutator is also reduced.

In Fig. 5 is shown a motor embodying a modification of my invention which combines high starting torque with good speed regulation as well as high power factor. The stator is provided with a phase winding 31, which is serially connected, through brushes 32, to a commutator winding 33 disposed on the periphery of the rotor 34. The rotor has an additional winding 35, which may be disposed adjacent to the commutator winding 33 and which may be short-circuited by a short-circuiting switch 36 actuated by a speed-responsive device 37. The stator winding 31 has taps 38 which may be closed-circuited through a switch 39 which is actuated by the same speed-responsive device 37 that operates the short-circuiting device 36 of the rotor. Instead of a separate rotor winding 35, the commutator winding 33 may have short-circuiting taps for providing an induced closed circuit.

When the motor is at rest, the short-circuiting device 36 and the switching device 39 are open. When the motor is started by closing the line switch 2, it operates as a series motor having very favorable starting characteristics. After the motor has attained a speed near synchronism, the speed-responsive device 37 closes the short-circuiting and switching devices 36 and 39, providing a closed-circuited induced winding upon the rotor, which now operates, in conjunction with the portion of the stator winding which is connected through the switching device 39 to the neutral point 40, as an induction motor having favorable speed regulation and tending to maintain an approximately constant speed. The portion of the stator winding between the neutral point 40 and the brushes 32 is so arranged and proportioned that it supplies to the rotor a voltage component required for securing the desired magnetization to control the power factor of the motor, as in the case of the motors shown in Figs. 1 and 3.

Instead of using a speed-responsive device for carrying out the operations of close-circuiting the rotor winding and providing the neutral connection on the stator winding, I may utilize hand-operated mechanisms.

In Fig. 6 is shown a preferred embodiment of my invention, which is similar to that of Fig. 5. In addition to the peripherally disposed commutator winding 41, the rotor 42 has a low-resistance squirrel-cage winding 43, disposed radially deeper than the commutator winding and separated therefrom by a magnetic bridge 44 of such capacity that approximately the entire rotor flux threads through the squirrel-cage winding 43 when the rotor operates at low slips, or near synchronism, and only a small fraction of the rotor flux threads through the squirrel-cage winding when the motor is started, or, in general, when the motor operates at large slips. The main stator winding 45 is serially connected, through brushes 46, to the commutator winding 41. An auxiliary stator winding 47 is provided, being connected between the brushes 46 and a neutral point 48, by means of a switch 49.

The motor is started with the series connection, the switch 49 being open. Under these conditions, the rotor develops a good starting torque similar to the motor shown in Fig. 5. As the speed increases, the flux penetrates to the squirrel-cage winding 43, and the motor assumes shunt characteristics. By the closure of the switch 49, which may be effected either manually or automatically, by known instrumentalities, the auxiliary winding 47 is connected in shunt to the brushes and provides the auxiliary voltage component required for operating the motor at any desired power factor above or below unity. The relative arrangements of the brushes and the stator windings are chosen in analogy to the conditions found most desirable in the design of polyphase series motors, the auxiliary winding 47 being so proportioned and of such phase relation as to give the desired power-factor with the position of the brushes selected from the view-point of securing good starting torque.

The motor is also provided with a polyphase resistor device 51 which is so combined with the rotor as to provide a high-resistance, closed inductor circuit. As shown in Fig. 6, the resistor device 51 is permanently connected across the terminals of the auxiliary winding 47, constituting a permanently closed circuit, in shunt to the brushes 46, having sufficiently high resistance to prevent the motor from running away in case the phase leads of the motor are accidentally reversed. As is known, a reversal of the phase sequence of the supply current of a series motor does not change the direction of rotation of the motor, it being necessary to shift the position of the brushes with respect to the winding of the stator in order to reverse the direction of the rotation. The reversal of the phase connections reverses the direction of rotation which the squirrel-cage winding tends to impart to the rotor. With the reversed phase connections, therefore, the machine starts as a series motor in the same direction as before, turning the high-reactance, buried squirrel-cage winding at a high slip, and therefore at a low torque, against its normal direction of rotation, so that, without the restraining influence of the relatively high-resistance shunt connections 51, the squirrel-cage torque of itself would never build up to a value comparable to the series-motor torque. In order to reverse the direction of rotation, it is necessary to shift the brushes, as in the ordinary series motor, as well as to reverse the phase connections, as in the ordinary shunt motor.

I claim as my invention:

1. An alternating-current, dynamo-electric machine comprising primary and secondary members, primary phase windings on said primary member, a commutator winding on said secondary member, a plurality of brushes co-operating with said commutator winding, said primary phase windings being connected in series with said brushes, means providing closed-circuited induced-winding connections on said secondary member, and switching means for establishing auxiliary winding connections on said primary member providing a shunt exciting circuit connected to said brushes.

2. In an alternating-current motor, the combination with an armature having a commutator winding, polyphase brushes cooperating with said winding, a stator member having polyphase windings, means for connecting at least a portion of said stator windings in series relation with said commutator winding, and supply terminals for a plurality of points of said stator windings, said windings and brushes being arranged for operation as a series motor, of means providing a closed-circuited induced-winding connection on said armature and a star connection on a plurality of points of said stator windings.

3. A polyphase alternating-current motor comprising primary and secondary members, a polyphase winding having supply terminals on said primary member, a winding having a commutator on said secondary member, a plurality of brushes cooperating with said commutator, means for connecting at least a portion of said primary winding and said brushes for operation as a series motor, a high reactance, low-resistance closed-circuited winding connection on said secondary member, and means for, at times, connecting a portion of said primary winding in shunt to said brushes.

4. In an alternating-current motor, the combination with an armature having a commutator winding, polyphase brushes cooperating with said winding, a stator member having polyphase windings, supply terminals for a plurality of points of said stator windings, said windings and brushes being arranged for operation as a series motor, and a high-reactance, low-resistance closed-circuited winding connection on said secondary member, of means providing stator winding connections to operate as the primary member of an induction motor in conjunction with said closed-circuited winding connection as the secondary member, and means providing a shunt exciting circuit for energizing the said brushes.

5. A polyphase alternating-current motor comprising primary and secondary members, a polyphase winding having supply terminals on said primary member, a commutator winding disposed at the periphery of said secondary member, a squirrel-cage winding of relatively low-resistance disposed upon said secondary member at greater radial depth than said commutator winding, polyphase brushes cooperating with said commutator winding, connections between said brushes and windings on the primary member for operation as a series motor, said secondary windings being separated by magnetic bridges shunting most of the flux penetrating the rotor at speeds remote from synchronism, and means for connecting a portion of the windings on the primary member in parallel to said brushes to control the power-factor of said motor.

6. An alternating-current motor comprising a stator and a rotor, polyphase windings disposed upon said stator, said rotor comprising a commutator winding disposed in slots near the periphery of the rotor and a squirrel-cage winding of low resistance disposed in slots below said first mentioned slots, said two sets of slots being separated by magnetic bridges shunting a part of the flux during operation at speeds remote from synchronism, polyphase brushes cooperating with said commutator winding, at least a portion of said polyphase stator windings being connected in series with said brushes to cooperate with said commutator winding as a series motor, and means for establishing a star connection for at least a portion of said primary winding.

7. An alternating-current motor comprising a stator and a rotor, a primary polyphase winding disposed upon said stator, means for supplying polyphase currents to said primary polyphase winding, a commutator winding disposed at the periphery of said rotor, a squirrel-cage winding disposed upon said rotor at greater radial depths that said commutator winding, said two last-mentioned windings being separated by magnetic bridges of such capacity as to cause only a fraction of the flux penetrating the rotor periphery to thread said squirrel-cage winding at speeds remote from synchronism and to cause the major portion of said flux to thread said squirrel cage winding at speeds near synchronism, polyphase brushes cooperating with said commutator winding, said polyphase primary winding being connected in series with said brushes to cooperate with said commutator winding as a series motor at speeds remote from synchronism, and primary winding connections for providing a neutral point for limiting the speed of the motor and for providing a shunt exciting circuit connected in parallel to said brushes for controlling the power-factor of said motor.

8. In an alternating-current motor, the combination with an armature having a commutator-winding, polyphase brushes cooperating with said winding, and a polyphase primary winding connected in series relation to said commutator-winding, said windings and brushes being arranged for operation as a series motor, of means for providing permanent additional shunt-motor winding connections for preventing said motor from increasing in speed above a predetermined value for any definite brush position, whether said motor is running in the direction of rotation of the magnetic field or opposite thereto.

9. In an alternating-current motor, the combination with an armature having a commutator-winding, polyphase brushes cooperating with said winding, a polyphase primary winding connected in series with said commutator-winding, and supply terminals for said primary windings, said windings and brushes being arranged for operation as a series motor, of means for providing permanent additional shunt-motor winding connections for preventing said motor from increasing in speed above a predetermined value for any definite brush position whether said motor is running in the direction of rotation of the magnetic field or opposite thereto, and means for establishing connections for operating said motor as a compensated shunt motor.

10. A polyphase alternating-current motor comprising primary and secondary members, a polyphase winding having supply terminals on said primary member, a winding having a commutator on said secondary member, a plurality of brushes cooperating with said commutator, means for connecting at least a portion of said primary winding and said brushes for operation as a series motor, a high-reactance, low-resistance closed-circuited winding on said secondary member, and means for providing a low-reactance, relatively high-resistance closed inductor circuit adapted to cooperate with a magnetic field rotating oppositely to the direction of rotation of said rotor to produce a torque opposed to the torque of the series-motor connection, whereby excessive speeds are prevented.

11. A polyphase alternating-current motor comprising primary and secondary members, a polyphase winding having supply terminals on said primary member, a winding having a commutator on said secondary member, a plurality of brushes cooperating with said commutator, means for connecting at least a portion of said primary winding and said brushes for operation as a series motor, a high-reactance, low-resistance closed-circuited winding connection on said secondary member, means for, at times, connecting a portion of said primary winding in shunt to said brushes, and means for providing a permanent low-reactance, relatively high-resistance closed inductor circuit adapted to cooperate with a magnetic field rotating opposite to the direction of rotation of said rotor to produce a torque opposed to the torque of the series-motor connection, whereby excessive speeds are prevented.

12. A polyphase alternating-current motor comprising primary and secondary members, a polyphase winding having supply terminals on said primary member, a winding having a commutator on said secondary member, a plurality of brushes cooperating with said commutator, means for connecting said primary winding and said brushes for operation as a series motor, a high-reactance, low resistance closed-circuited winding connection on said secondary member, and additional primary windings connected in shunt to said brushes to control the power factor of said motor.

13. A polyphase alternating-current motor comprising primary and secondary members, a polyphase winding having supply terminals on said primary member, a commutator winding disposed at the periphery of said secondary member, a squirrel-cage winding of relatively low resistance disposed upon said secondary member at greater radial depth than said commutator winding, polyphase brushes cooperating with said commutator winding, said primary winding and said brushes being connected for operation as a series motor, said secondary windings being separated by magnetic bridges shunting most of the flux penetrating the rotor at speeds remote from synchonism, and additional primary windings connected in shunt to said brushes to control the power factor of said motor.

14. A polyphase alternating-current motor comprising primary and secondary members, a main polyphase winding having supply terminals on said primary member, an additional polyphase winding on said primary member, a commutator winding disposed at the periphery of said secondary member, a squirrel-cage winding of relatively low resistance disposed upon said secondary member at greater radial depth than said commutator winding, polyphase brushes cooperating with said commutator winding, said main primary winding and said brushes being connected for operation as a series motor, said secondary windings being separated by magnetic bridges shunting most of the flux penetrating the rotor at speeds remote from synchronism, and means providing relatively high-resistance shunt connections between said brushes, said shunt brush connections including said additional primary windings, whereby the latter are connected in shunt relation to said brushes to control the power factor of said motor.

In testimony whereof, I have hereunto subscribed my name this 20th day of April, 1925.

LAURENCE M. PERKINS.